United States Patent [19]

Amdahl et al.

[11] Patent Number: 4,578,750

[45] Date of Patent: Mar. 25, 1986

[54] CODE DETERMINATION USING HALF-ADDER BASED OPERAND COMPARATOR

[75] Inventors: Gene M. Amdahl, Atherton; Hsiao-Peng S. Lee; Stephen J. Rawlinson, both of Sunnyvale; Stephen F. Stuart, Mountain View, all of Calif.

[73] Assignee: Amdahl Corporation, Sunnyvale, Calif.

[21] Appl. No.: 526,047

[22] Filed: Aug. 24, 1983

[51] Int. Cl.⁴ .......................... G06F 9/00; G06F 7/00
[52] U.S. Cl. .................................................. 364/200
[58] Field of Search ... 364/200 MS File, 900 MS File

[56] References Cited

U.S. PATENT DOCUMENTS 3,881,173  4/1975  Larsen et al. ...................... 364/200
4,016,545  4/1977  Lipouski ............................. 364/900
4,200,927  4/1980  Hughes et al. ..................... 364/200
4,399,507  8/1983  Cosgrove et al. .................. 364/200

Primary Examiner—Raulfe B. Zache
Assistant Examiner—William G. Niessen
Attorney, Agent, or Firm—Fliesler, Dubb, Meyer & Lovejoy

[57] ABSTRACT

Disclosed is a method and apparatus for predicting the condition code of a condition-code-setting instruction by comparing operands in a data processing system. An operand comparator includes one or more half-adders to predict carry outs at an early time. The comparator is used in a data processing system which is operative in response to instructions having operation codes for specifying operations to be executed. The instructions also have operand fields for identifying operands to be utilized in connection with executing the instructions.

24 Claims, 14 Drawing Figures

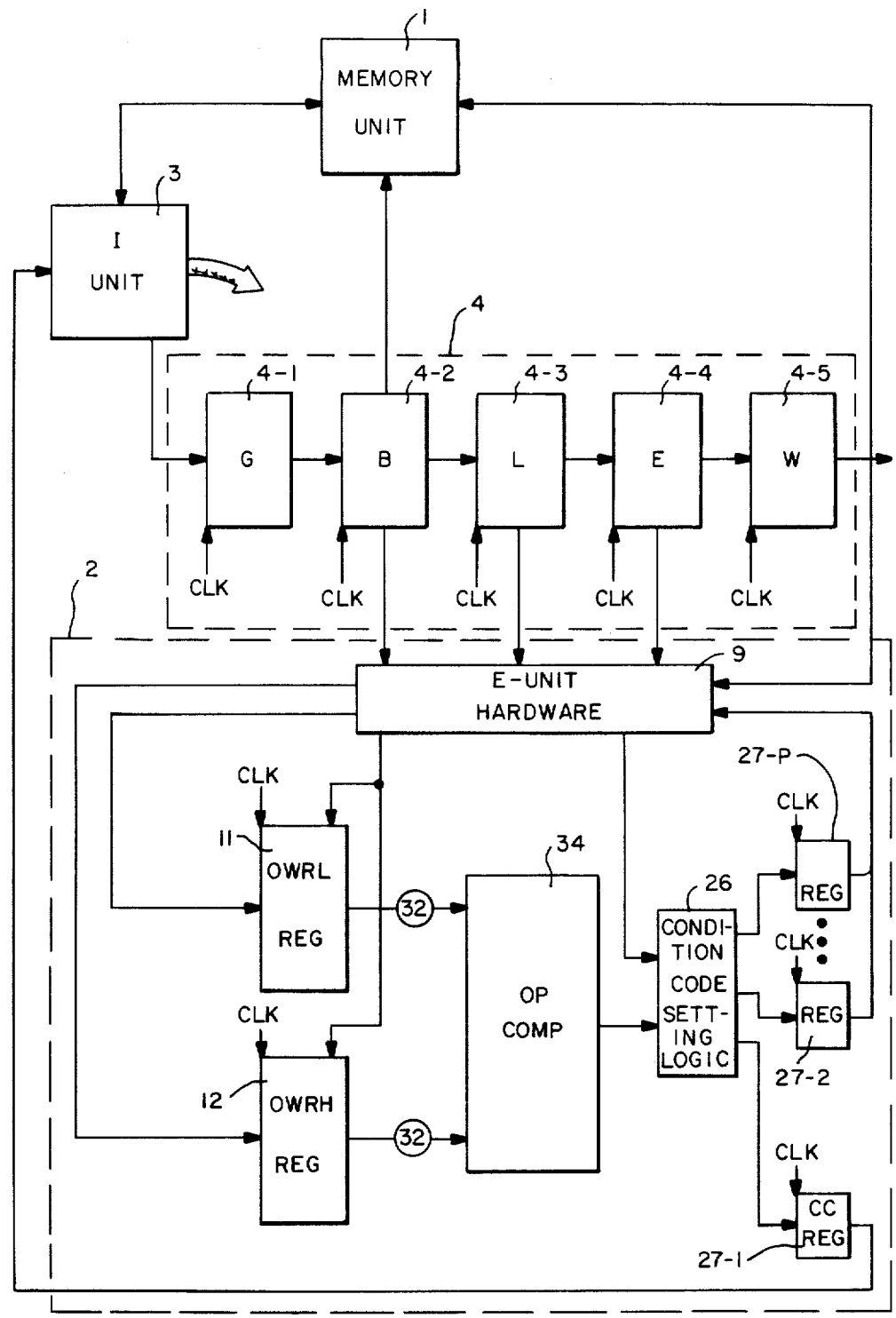
FIG.—1

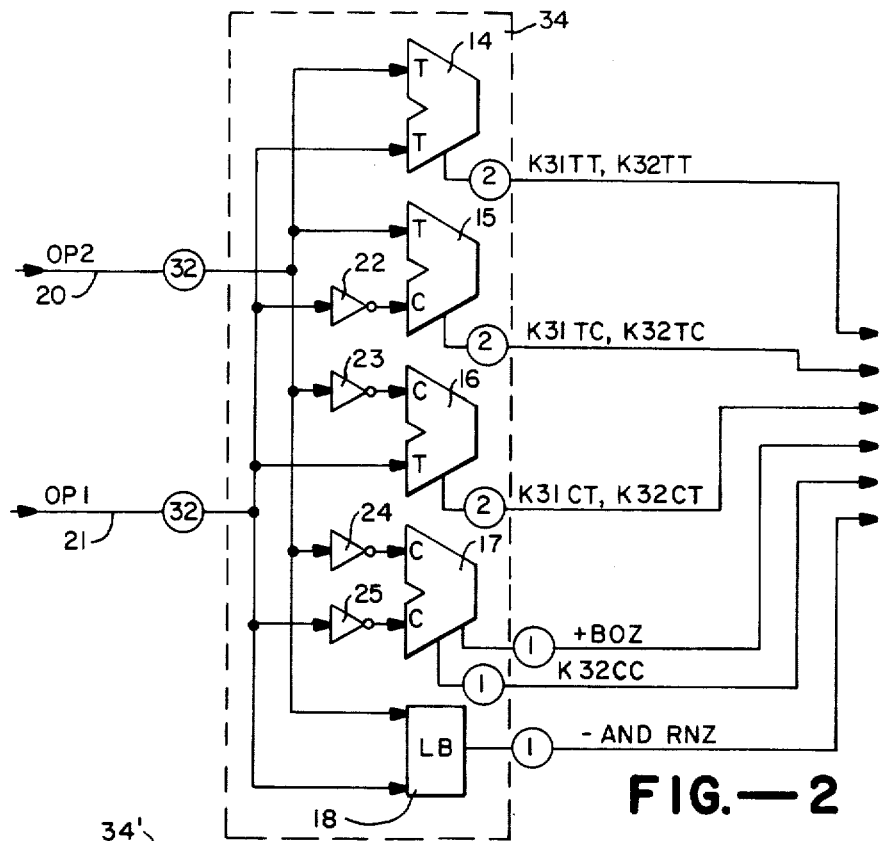
FIG.—2
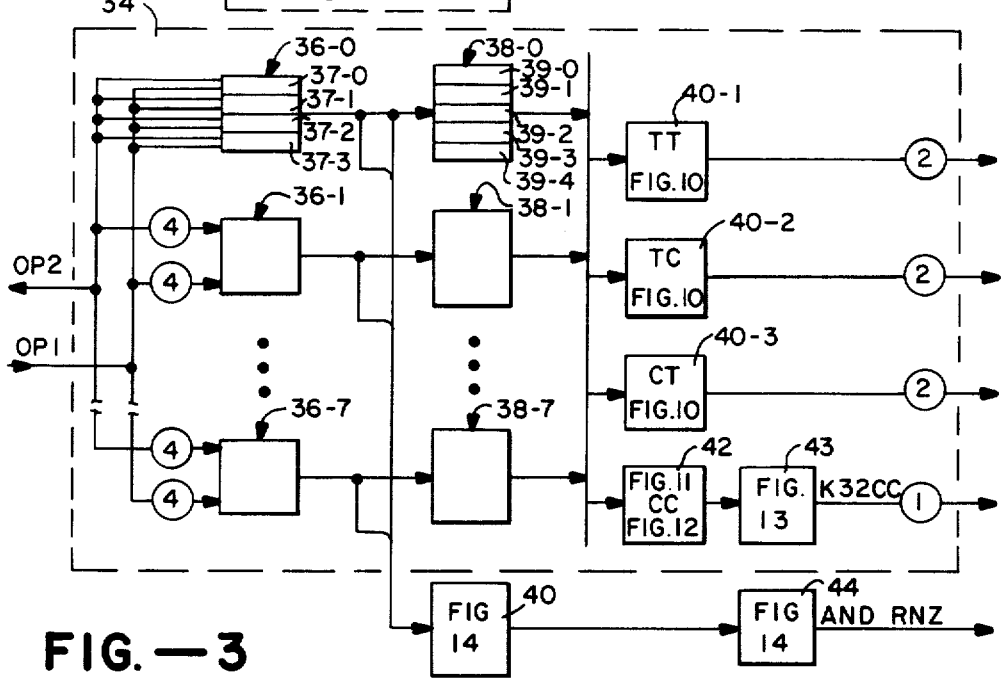
FIG.—3

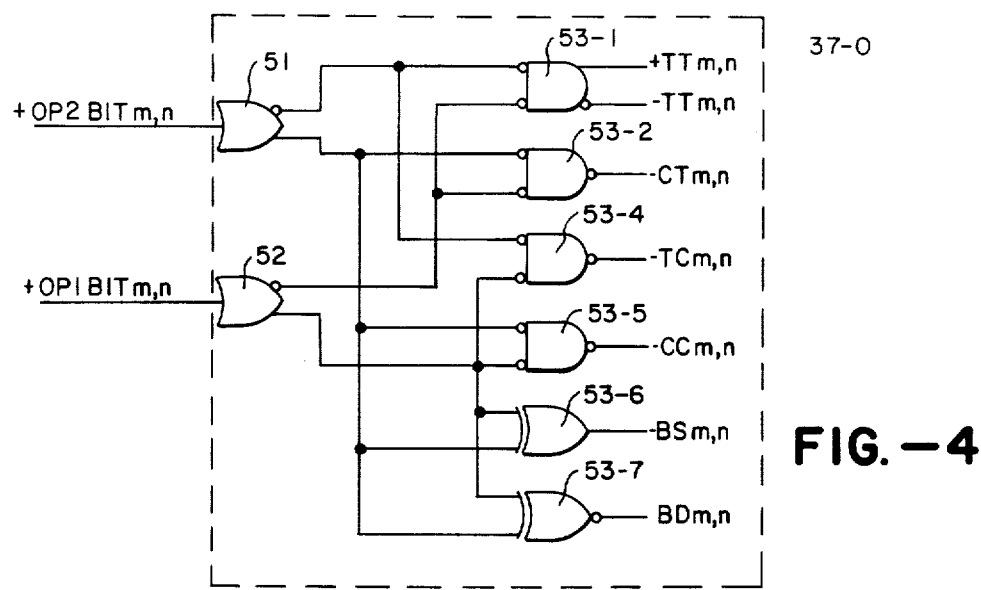
FIG. —4
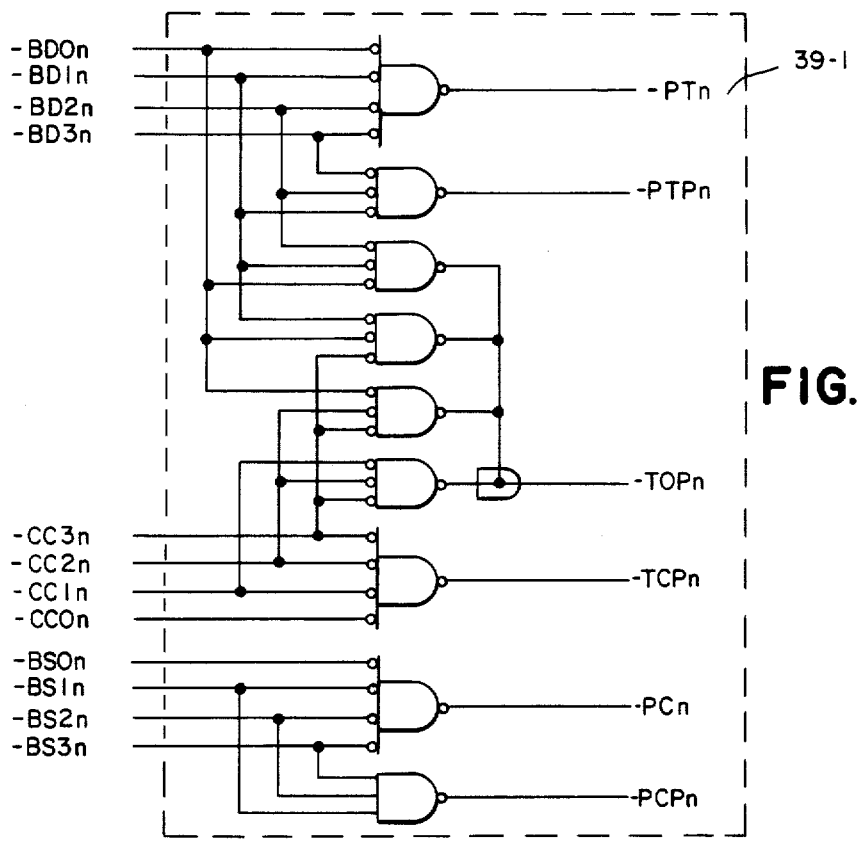
FIG. —5

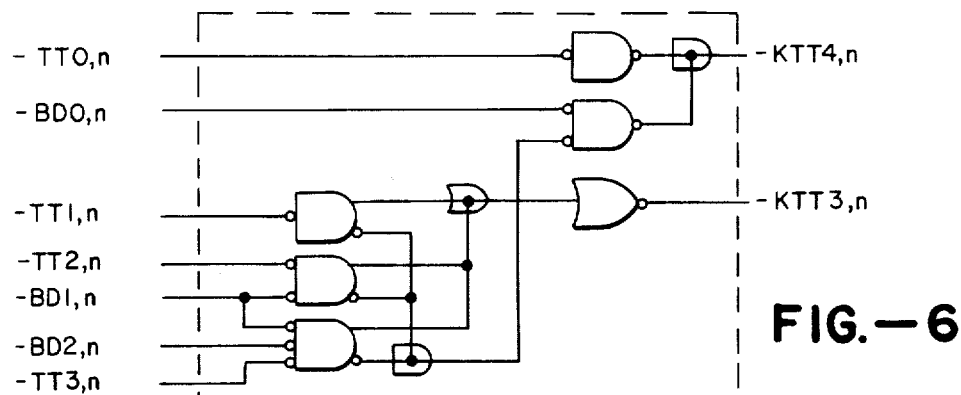
FIG.—6
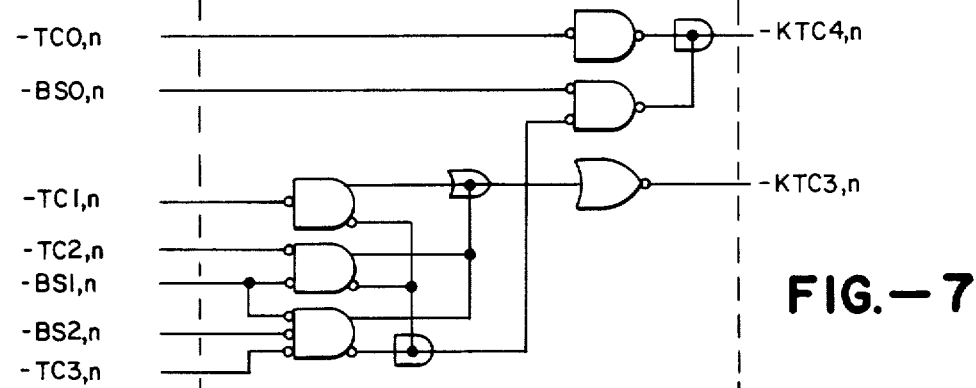
FIG.—7
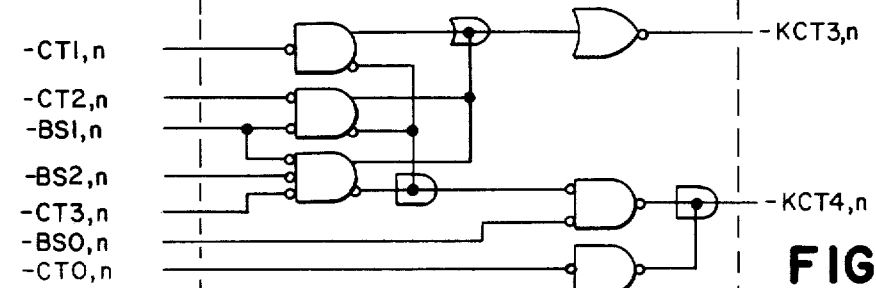
FIG.—8
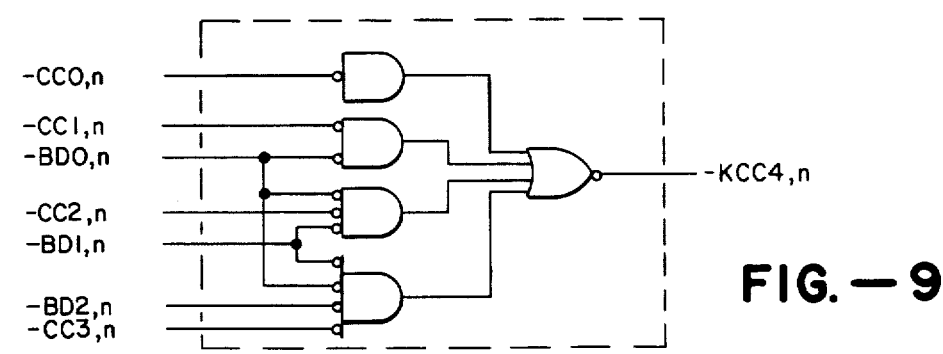
FIG.—9

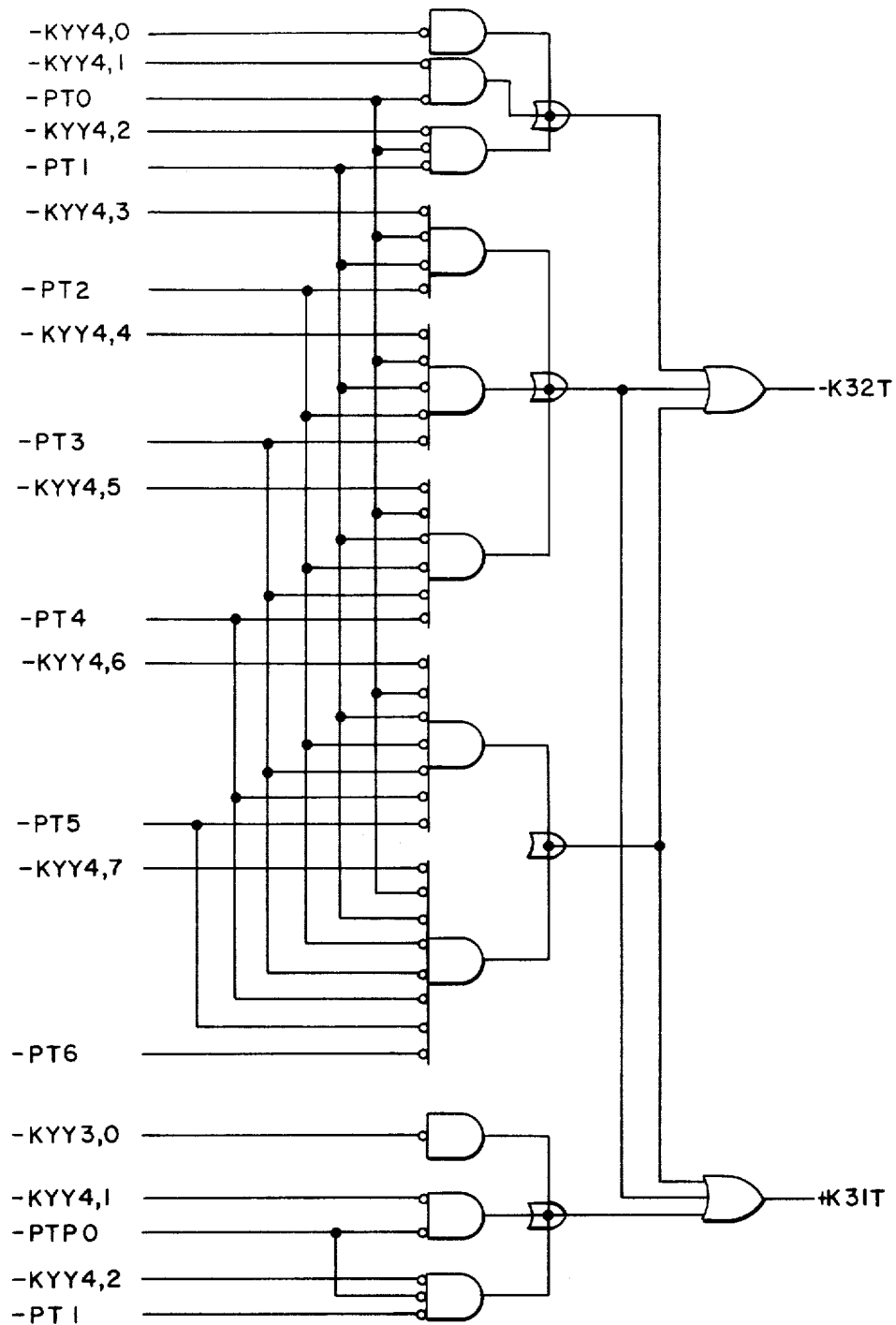
FIG.—10

CODE DETERMINATION USING HALF-ADDER BASED OPERAND COMPARATOR

BACKGROUND OF THE INVENTION

The present invention relates to the field of instruction-controlled digital computers and specifically, to the processing of condition-code-setting instructions and branch-on-condition instructions, such as defined, for example, by OS/370 architecture.

Branch-on-condition instructions are an important part of the data processing system. The manner in which these instructions are processed is an important factor in the cost and performance of the system because such instructions are statistically common instructions in programs.

When branch instructions are processed, they require the interrogation of a condition code (CC), which is set by a previous condition-code-setting instruction, to determine which of two instruction streams will be thereafter followed. In a pipelined environment, the branch-on-condition instruction will start execution before the completion of execution of the condition-code-setting instruction. The condition-code-setting instruction should determine the condition code as soon as possible because if it does not, processing of the branch instructions may be delayed until the condition code is set. Any delay in instruction processing, of course, deleteriously affects the performance of the data processing system.

U.S. Pat. No. 3,881,173 describes a method and apparatus for use in a data processing system wherein the condition code upon which a branch instruction acts is set as a function of the condition-code-setting instruction and a related comparison of the operands of the instruction. The condition code can be calculated before the completion of the execution of the condition-code-setting instruction. The criteria for comparing the operands are determined by the instruction being executed.

In that patent, means are provided within the execution unit for decoding the OP code of an instruction and controlling a comparator within the execution unit for selecting an appropriate comparison criteria for comparing the operands. The operands are concurrently gated into the comparator and a determination is made to set the condition code. The condition code is set within one cycle of the data processing system, or two cycles for double word processing, independently of how many execution cycles are required for a complete execution of the instruction. When a branch instruction interrogates the condition code latch and determines that a branch is to be taken, the branch instruction immediately causes the instruction processing pipeline to be cleared of any instructions in the non-taken instruction stream and commences immediately to process instructions in the to be taken instruction stream.

While the comparison carried out by the method of U.S. Pat. No. 3,881,173 has proved to be very satisfactory, there is still a need for an improved comparator capable of high speed at low cost.

SUMMARY OF THE INVENTION

This invention is a method and apparatus for predicting the condition code of a condition-code-setting instruction by comparing operands in a data processing system. An operand comparator includes one or more half-adders to predict carry outs at an early time. The comparator is used in a data processing system which is operative in response to instructions having operation codes for specifying operations to be executed. The instructions also have operand fields for identifying operands to be utilized in connection with executing the instructions.

In the system, an instruction unit processes instruction streams which typically include branch instructions specifying one of a plurality of possible instruction streams to be taken. Which instruction stream is to be taken is determined by the branch instruction after examining the current condition code of the system. A condition code-setting instruction specifies first and second operands to be utilized in execution.

The operand comparator compares the operands of the condition-code-setting instruction to form comparison results. The comparison results are used for setting the condition code without having to wait for the complete execution of the condition-code-setting instruction.

The operand comparator forms comparison results in the form of Carry-out predictions (indicated in parentheses) simultaneously for one or more of the following types of additions:

32-Bit Operands, Both Operands Uncomplemented (TT)

31-Bit Operands, Both Operands Uncomplemented (TT)

32-Bit Operands, First Operand Two's Complemented (TC)

31-Bit Operands, First Operand Two's Complemented (TC)

32-Bit Operands, Second Operand Two's Complemented (CT)

31-Bit Operands, Second Operand Two's Complemented (CT)

32-Bit Operands, Both Operands Two's Complemented (CC)

The following predictions are also made:

32-Bit Operands, Both Operands Zero (BOZ)

32-Bit Operands, "AND" Result Zero (ARZ)

Use of this comparator enables early predictions of the condition code for fixed-point algebraic and logical additions, subtractions and comparisons. The condition code for floating-point short compare and for logical AND, inclusive OR, and exclusive OR are also predicted early.

The Logical Compare uses the carry-outs TC and CT. The Logical Addition uses the carry-outs BOZ, TT and CC. The Logical Subtraction uses the carry-outs CT and TC. The Algebraic Compare (Signs Equal) uses the carry-outs TC and CT. The Algebraic Compare (Signs Different) uses the carry-outs TC and CT. The Logical Exclusive OR uses the carry-outs TC and CT. The Algebraic Addition (Signs Equal) uses the carry-outs TT and BOZ. The Algebraic Addition (Signs Different) uses the carry-outs TT and CC. The Algebraic Subtraction (Signs Equal) uses the carry-outs TC and CT. The Algebraic Subtraction (Signs Different) uses the carry-out CT. Refer to Chart 4 for a detailed description.

The carry outs for 31-bit operands are derived from the 32-bit operands by dropping the highest-order bits. The 31-bit carry-out predictions are used for floating-point short compares and for determining overflow in algebraic additions and subtractions.

The comparator has the ability to predict a carry-out if both operands are two's complemented, and hence have two carry-ins. This processing of two carry-ins simultaneously with two operands provides a high speed comparison which enhances the speed of the comparator.

In accordance with the above summary, the present invention achieves the objective of providing an improved method and apparatus, using an improved half-adder operand comparator, for setting codes in a data processing system.

The present invention can also be used for internal control of the execution unit. The internal controls include tests for operands equal, OP1 less than OP2, and quotient overflow for fixed-point divide.

Additional objects and features of the present invention will appear from the following description in which the preferred embodiments of the invention have been set forth in detail in conjunction with the drawings.

BRIEF DESCRIPTION OF THE DRAWINGS

FIG. 1 depicts a schematic representation of a data processing system including an operand comparator.

FIG. 2 depicts a schematic block diagram of the operand comparator utilized in the FIG. 1 system.

FIG. 3 depicts a further detailed block diagram of the operand comparator of FIG. 2.

FIG. 4 depicts a logic diagram of a bit slice which forms part of the FIG. 3 comparator.

FIGS. 5 through 9 each depict logic diagrams which form intermediate logic blocks which combine signals from the bit slice logic blocks of the FIG. 4 type.

FIG. 10 is a logic diagram of outputs from the intermediate blocks of FIGS. 5 through 9 and forms the output for three half-adders TT, TC, CT represented in FIG. 2.

DETAILED DESCRIPTION

Figure 11:
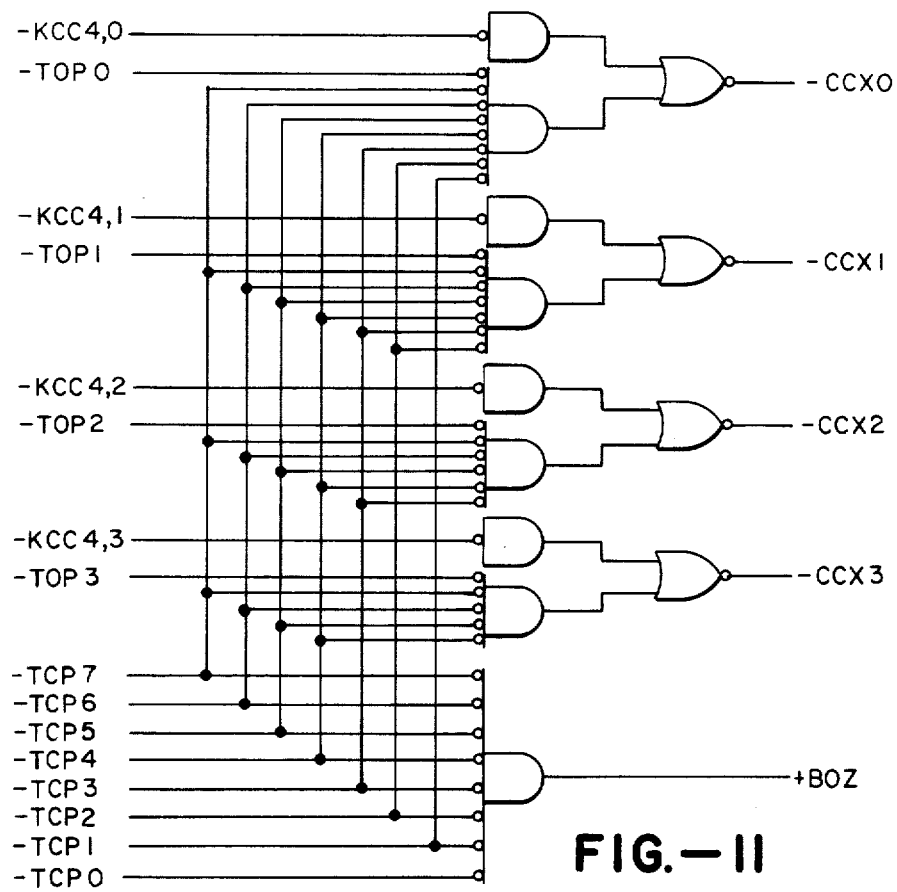
FIGS. 11, 12, and 13 represent the final accumulation logic for the fourth half-adder CC represented in FIG. 2.

In FIG. 1, a data processing system includes a memory unit 1, an execution unit 2 and instruction unit 3. Memory unit 1 is a generalized memory which typically includes main store, buffer store and architecturally-defined internal registers. Instructions are fetched from the memory unit 1 by the instruction unit 3 and are sequentially executed in an instruction pipeline 4.

The execution unit 2 includes the OWRL register 11 which holds the first operand, OP1, and the OWRH register 12 which holds the second operand, OP2. THe first and second operands are used by the additional execution unit hardware 9 in the execution of the instruction. Some condition-code-setting instructions take many E cycles for complete execution. It is often desirable to know certain properties (e.g., operands are equal, one operand is greater than the other) about the results of the execution prior to the time that the actual execution is completed in order to set the condition code early. If a branch-on-condition instruction follows this instruction, the branch can be determined early and time is not wasted on the execution of the unselected instruction stream.

In FIG. 1, the operand comparator 34 compares OP1 and OP2 at an early time. The comparator 34 supplies comparison results to the condition-code-setting logic 26 which sets the condition code register 27-1, and also sets other registers 27-2, ..., 27-P for internal control of the execution unit 2.

The outputs from the half-adders 14 through 17 and logic block 18 of FIG. 2 are summarized in the following CHART 1:

| CHART 1 | |
|---|---|
| K32TT | (Bits 0-31, Both Operands Uncomplemented) |
| K31TT | (Bits 1-31, Both Operands Uncomplemented) |
| K32TC | (Bits 0-31, OP1 Complemented) |
| K31TC | (Bits 1-31, OP1 Complemented) |
| K32CT | (Bits 0-31, OP2 Complemented) |
| K31CT | (Bits 1-31, OP2 Complemented) |
| K32CC | (Bits 0-31, Both Operands Complemented) |
| BOZ | (Both Operands Zero) |
| AND RNZ | ("AND" of OP1 and OP2 Non-Zero) |

Each of the first seven outputs listed above is logically "true" if there is a carry-out from the indicated addition. (K32CC is logically "false" if there is a carry-out of two from that addition.)

One detailed implementation of the comparator 34 involves partitioning the 32-bit operands into eight slices of four bits each. Information is computed from each slice and then assembled to form the outputs listed above in CHART 1.

In FIG. 2, a schematic representation of the operand comparator 34 of FIG. 1 is shown. The operand comparator 34 includes four half-adders 14, 15, 16, and 17 and a logic block 18. Each of the half-adders 14 through 17 and the logic block 18 receives as inputs OP1 and OP2 from the registers 11 and 12, respectively, of FIG. 1. The complements are generated by the inverters 22, 23, 24, and 25 in FIG. 2.

The half-adder 14 receives the true values of both OP1 and OP2 . Accordingly adder 14 has the labels T and T on its inputs.

The half-adder 15 receives the true input for OP2 and the complement input for OP1 and hence its inputs are labelled T and C, respectively. The half-adder 16 receives the complement input for OP2 and the true input for OP1 and hence its inputs are labelled C and T, respectively. The half-adder 17 receives the complement input for both OP1 and OP2 and hence has its inputs labelled C and C.

The half-adders 14 through 17 of FIG. 2 generate carry-outs but do not perform a full addition. Specifically, the TT half-adder 14 generates the carry-out for the 31st bit designated as K31TT and generates the carry-out for the 32nd bit designated as K32TT. Similarly, the TC half-adder 15 generates the outputs K31TC and K32TC. The CT half-adder 16 generates the outputs K31CT and K32CT. Finally, the CC half-adder 17 generates a K32CC output. The output K31CC (not shown) is not generated by the half-adder 17 but such an output can be readily generated if desired.

The outputs from the half-adders 14 through 17 and from logic block 18 are provided as inputs to the condition-code-setting logic 26 of FIG. 1.

Instruction pipeline 4, in one typical embodiment, includes a plurality of segmented stages. For example, the G stage 4-1 generates the memory addresses of the operands to be processed by the instruction. The B stage 4-2 accesses the operands from the memory unit. The L stage 4-3 performs logical and checking operations on the operands. The E stage 4-4 controls the execution of the instruction. The W stage 4-5 writes the results of the execution into memory.

The stages in the pipeline 4 are shown as representative. Additional or other stages can be employed. For additional stages which are frequently employed, reference is made to U.S. Pat. No. 3,881,173 which describes an instruction pipeline with multiple stages.

An example of how instructions are sequenced is given in the following CHART 2:

| | CHART 2 | | | | | | | |
|---|---|---|---|---|---|---|---|---|
| | CYCLES | | | | | | | |
| INSTRUCTION | CYC1 | CYC2 | CYC3 | CYC4 | CYC5 | CYC6 | CYC7 | CYC8 |
| I1 | G1 | B1 | L1 | E1 | W1 | | | |
| I2 (CCS) | | G2 | B2 | L2 | E2 | W2 | | |
| I3 (BOC) | | | G3 | G3 | B3 | L3 | E3 | W3 |
| I4 | | | | | G4 | B4 | L4 | E4 |
| . | | | | | | . | . | . |
| . | | | | | | | | |
| I9 (Target) | | | | | | G9 | B9 | L9 |

In CHART 2, an instruction stream including instructions I1, I2, I3, I4, . . . , I9 is shown. A first instruction, I1, is fetched by the I unit 3 and is processed by the G stage 4-1 during cycle CYC1. During cycle CYC2, the I1 instruction is processed by the B stage 4-2. In a similar manner the I1 instruction is processed by the L stage 4-3, E stage 4-4 and the W stage 4-5 at cycles CYC3, CYC4 and CYC5, respectively.

The second instruction I2 in the instruction stream is a condition-code-setting instruction which is processed by the G stage 4-1 during CYC2. The I2 instruction is processed by the instruction pipeline so that it appears in the B, L, E and W stages at CYC3, CYC4, CYC5, CYC6, respectively. Since instruction I2 is a condition code setting instruction, one example representing the processing is as follows. During CYC2, the G2 stage determines the addresses for OP1 and OP2. During CYC3, the B2 stage accesses OP1 and OP2 from memory unit 1 and clocks them into the OWRL register 11 and the OWRH register 12, respectively at the end of CYC3.

After OP1 and OP2 have been clocked into the registers 11 and 12 and at the end of CYC3, the operand comparator 34 of FIG. 1 commences the comparisons of OP1 and OP2. The L stage 4-3 controls the condition-code-setting logic 26 to set the CC-register 27-1 at the end of CYC4. The outputs from the CC-register 27-1 and other execution unit status are sent back to the I unit 3 for use in controlling the branch decision and interrupts.

Referring to CHART 2, it is assumed for purposes of explanation that the instruction I3 is a branch-on-condition instruction. The condition code determining whether or not to branch is set by the instruction I2 as previously explained. In cycle CYC3, the I3 instruction is processed by the G stage 4-1. Since the condition code register 27-1 is set at the end of CYC4 by I2, the branch decision cannot be made prior to cycle CYC5. Therefore, the I-unit 3 causes a delay in the processing of the instruction I3 to line up CYC5 with B3. This delay is represented in CHART 2 by a repeat of the G stage G3, which appears during CYC4. If the branch is taken, then the G9 segment of the target instruction I9 will be processed during cycle CYC6 and segment B4 of I4 will be cancelled. If the branch is not taken then the B4 segment of the next instruction, I4, is processed during CYC6.

If the condition code cannot be set at the end of the CYC4 by I2, both G4 (if branch is not taken) or G9 (if branch is taken) will be delayed by as many additional cycles as it takes to set the condition code by I2. In the case that the condition code is set from the result of the I2 execution, it will be set at the end of cycle CYC5 at the earliest. Either G4 or G9 will be delayed by one cycle. In FIG. 3, a detailed implementation of comparator 34 for 32-bit operands, is shown. The eight 4-bit slices are represented by the eight logic blocks 36-0, 36-1, . . . , 36-7.

In FIG. 3, each of the 4-bit slices receives four of the bits of each of the input operands OP1 and OP2. For example, block 36-0 receives the four input bits 0, 1, 2, and 3 for each operand. Block 36-1 receives the four input bits 4, 5, 6, and 7 and so on until block 36-7 receives the inputs 28, 29, 30 and 31.

Each of the blocks 36-0 through 36-7 includes four 1-bit slices. For example block 36-0 includes the 1-bit slices 37-0, 37-1, 37-2, and 37-3.

In FIG. 3, each of the eight blocks 36-0 through 36-7 provides outputs to a corresponding intermediate block 38-0, 38-1, . . . , 38-7 and to an intermediate block 40. Each of the blocks 38-0 through 38-7 in turn includes five sub-blocks. For example, the block 38-0 includes the sub-blocks 39-0, 39-1, . . . , 39-4. The outputs from the blocks 38-0 through 38-7 connect as inputs to the final accumulation blocks which are the TT block 40-1, the TC block 40-2, the CT block 40-3 and the CC blocks 42 and 43.

In FIG. 3, the intermediate block 40 provides outputs to the output block 44 which determines when the "AND" of OP1 and OP2 is non-zero.

In FIG. 4, a 1-bit slice 37-0 of the block 36-0 of FIG. 3 is shown as a typical one of the 32 one bit slices. The FIG. 4 bit slice is labelled with the inputs +OP2 BITm,n and +OP1 BITm,n. The letter "m" has the values 0, . . . , 3 and therefore, the FIG. 4 bit slice represents the four bit slices 37-0 through 37-3 within the block 36-0 of FIG. 3.

The letter "n" has the values 0, 1 . . . , 7 and therefore the bit slice of FIG. 4 also represents the bit slices for each of the eight blocks 36-0 through 36-7, each in turn having m equal to 0, . . . , 3. Accordingly, there are 32 bit slices of the FIG. 4 type in the FIG. 3 embodiment.

In FIG. 4, gate 51 provides the true and complement outputs for the input bit +OP2 BITm,n. Similarly the gate 52 provides the true and complement outputs for the input bit +OP1 BITm,n. The gates 53-1 through 53-7 provide various logical combinations of the OP1 and OP2 input bits. The logical combinations in FIG. 4 are summarized in the following TABLE 1.

TABLE 1

(FIG. 4)

m = 0,1,2,3
n = 0,1,...,7

| Input | Output (Comment) |
|---|---|
| + OP2 BITm,n<br>+ OP1 BITm,n | +TTm,n; +("AND" result nonzero)<br>−TTm,n; −(Both bits 1's)<br>−CTm,n; −(OP2 zero, OP1 1)<br>−TCm,n; −(OP2 one, OP1 0)<br>−CCm,n; −(Both bits 0's)<br>−BSm,n; −(Bits same)<br>−BDm,n; −(Bits different) |

In TABLE 1, the inputs shown in the left-hand column and the outputs shown in the right-hand column correspond to the inputs and the outputs in FIG. 4. In TABLE 1, the comment explaining the significance of the output term appears in parentheses. Note that the value of m in TABLE 1 is equal to 0,1,2 and 3 and the value of n is equal to 0,1,...,7. Accordingly, there are 32 different values for each of the inputs and each of the outputs in TABLE 1.

In FIG. 4 and TABLE 1, individual corresponding bits of OP1 and OP2 are matched against each other to determine if both are 1's (TT), both are 0's (CC), both are the same (BS), both are different (BD), and how different (TC or CT). In FIGS. 5–9 the outputs from FIG. 4 are assembled in groups of four to form the signals in the following CHART 3:

CHART 3

| PTn, PTPn | In an addition in which neither operand is complemented or in which both operands are 1's complemented, a 1 carries out if and only if there is a carry-in. PTn uses all 4 bits; PTPn uses the low order 3 bits. |
|---|---|
| PCn, PCPn | In an addition in which precisely one of the operands is 1's complemented, a 1 carries out if and only if there is a carry-in. PCn uses all 4 bits; PCPn uses the low order 3 bits. |
| TCPn | In an addition in which both operands are 1's complemented, a 2 carries out if and only if a 2 is carried in. TCPn uses all 4 bits. All 4 bits of each operand must be zero in order for TCPn to be true. |
| TOPn | In an addition in which both operands are 1's complemented, a 1 carries out if a 2 is carried in. (In this implementation, TOPn is also true when a 1 carries out without a 2 carrying in. TOPn is also true if a 2 carries out as a result of a 2 carrying in.) TOPn uses all 4 bits. |
| KTT4,n; KTT3,n | In an addition in which neither operand is complemented, a 1 carries out no matter whether there is a carry-in. KTT4,n uses all 4 bits; KTT3,n uses the low order 3 bits. |
| KTC4,n; KTC3,n | In an addition in which the first operand is 1's complemented and the second operand is uncomplemented, a 1 carries out no matter whether there is a carry-in. KTC4,n uses all 4 bits; KTC3,n uses the low order 3 bits. |
| KCT4,n; KCT3,n | In an addition in which the first operand is uncomplemented and the second operand is 1's complemented, a 1 carries out no matter whether there is a carry-in. KCT4,n uses all 4 bits; KCT3,n uses the low order 3 bits. |

-continued

CHART 3

| KCC4,n | In an addition in which both operands are 1's complemented, a carry-out (either 1 or 2) occurs no matter whether there is a carry-in. KCC4,n uses all 4 bits. |
|---|---|

The manner in which the signals of CHART 3 are formed are shown in detail in FIGS. 5 through 9. Additionally, the following TABLE 2, TABLE 3, ..., TABLE 6 summarize the inputs, as shown in the left-hand column, and the outputs, as shown in the right-hand column for the logic blocks of FIGS. 5 through 9, respectively. In FIGS. 5 through 9, TABLES 2 through 6, the value of "n" is equal to 0,1,...,7. These values of "n" correspond to the logic blocks 38-n in FIG. 3, that is, 38-0, 38-1, ..., 38-7.

TABLE 2

(FIG. 5)

| Input | Output (Comment) |
|---|---|
| −BD0,n | −PTn; (Propagate True, 4 bits) |
| −BD1,n | −PTPn; (Propagate True Partial, 3 bits) |
| −BD2,n | −TOPn; (Two-to-One Propagate, 4 bits) |
| −BD3,n | −TCPn; (Two Carry Propagate, 4 bits) |
| −CC3,n | −PCn; (Propagate Complement, 4 bits) |
| −CC2,n | −PCPn; (Propagate Complement Partial, 3 bits) |
| −CC1,n | |
| −CC0,n | |
| −BS0,n | |
| −BS1,n | |
| −BS2,n | |
| −BS3,n | | n = 0,1,...,7
(NOTE: Propagate does not include generate)

TABLE 3

(FIG. 6)

| Input | Output |
|---|---|
| −TT0,n | −KTT4,n (4 bits) |
| −BD0,n | −KTT3,n (3 bits) |
| −TT1,n | |
| −TT2,n | |
| −BD1,n | |
| −BD2,n | |
| −TT3,n | | n = 1,2,...,7

TABLE 4

(FIG. 7)

| Input | Output (Comment) |
|---|---|
| −TC0,n | −KTC4,n (4 bits) |
| −BS0,n | −KTC3,n (3 bits) |
| −TC1,n | |
| −TC2,n | |
| −BS1,n | |
| −BS2,n | |
| −TC3,n | | n = 1,2,...,7

TABLE 5

(FIG. 8)

| Input | Output |
|---|---|
| −CT1,n | −KCT3,n (3 bits) |
| −CT2,n | −KCT4,n (4 bits) |
| −BS1,n | |
| −BS2,n | |
| −CT3,n | |
| −BS0,n | |

TABLE 5-continued

(FIG. 8)

| Input | Output |
|---|---|
| −CT0,n | | n = 0,1,...,7

TABLE 6

(FIG 9)

| Input | Output |
|---|---|
| −CC0,n | −KCC4,n (4 bits) |
| −CC1,n | |
| −BD0,n | |
| −CC2,n | |
| −BD1,n | |
| −BD2,n | |
| −CC3,n | | n = 0, 1,...,7

In FIG. 10, the intermediate terms from the logic blocks 38-0 through 38-7 of FIG. 3 and TABLE 2 through TABLE 6 (FIGS. 5 through 9) are assembled to provide the outputs for three of the four half-adders, namely the half-adders 14, 15 and 16 of FIG. 2. In FIG. 10, the term YY used in the INPUT and in the OUTPUT represents one of three variables, namely, TT, TC, or CT. When the variable YY represents TT, FIG. 10 represents the logic block 40-1 in FIG. 3 which forms the output from the half-adder 14 of FIG. 2. When the variable YY represents TC, FIG. 10 represents the logic block 40-2 of FIG. 3 which forms the output from the half-adder 15 of FIG. 2. When the variable YY represents CT, FIG. 10 represents the logic block 40-3 of FIG. 3 which forms the output from the half-adder 16 of FIG. 2. The INPUT and the OUTPUT for FIG. 10 for the values of YY equal to TT, TC, and CT are represented by TABLE 7, TABLE 8, and TABLE 9, respectively.

TABLE 7

(FIG. 10)

| Input | Output |
|---|---|
| −KTT4,0 | +K32TT |
| −KTT4,1 | +K31TT |
| −PT0 | |
| −KTT4,2 | |
| −PT1 | |
| −KTT4,3 | |
| −PT2 | |
| −KTT4,4 | |
| −PT3 | |
| −KTT4,5 | |
| −PT4 | |
| −KTT4,6 | |
| −PT5 | |
| −KTT4,7 | |
| −pT6 | |
| −KTT3,0 | |
| −PTP0 | |

TABLE 8

(FIG. 10)

| Input | Output |
|---|---|
| −KTC4,0 | +K32TC |
| −KTC4,1 | +K31TC |
| −PC0 | |
| −KTC4,2 | |
| −PC1 | |
| −KTC4,3 | |
| −PC2 | |
| −KTC4,4 | |
| −PC3 | |

TABLE 8-continued

(FIG. 10)

| Input | Output |
|---|---|
| −KTC4,5 | |
| −PC4 | |
| −KTC4,6 | |
| −PC5 | |
| −KTC4,7 | |
| −PC6 | |
| −KTC3,0 | |
| −PCP0 | |

TABLE 9

(FIG. 10)

| Input | Output |
|---|---|
| −KCT4,0 | +K32CT |
| −KCT4,1 | +K31CT |
| −PC0 | |
| −KCT4,2 | |
| −PC1 | |
| −KCT4,3 | |
| −PC2 | |
| −KCT4,4 | |
| −PC3 | |
| −KCT4,5 | |
| −PC4 | |
| −KCT4,6 | |
| −PC5 | |
| −KCT4,7 | |
| −PC6 | |
| −KCT3,0 | |
| −PCP0 | |

Figure 12:
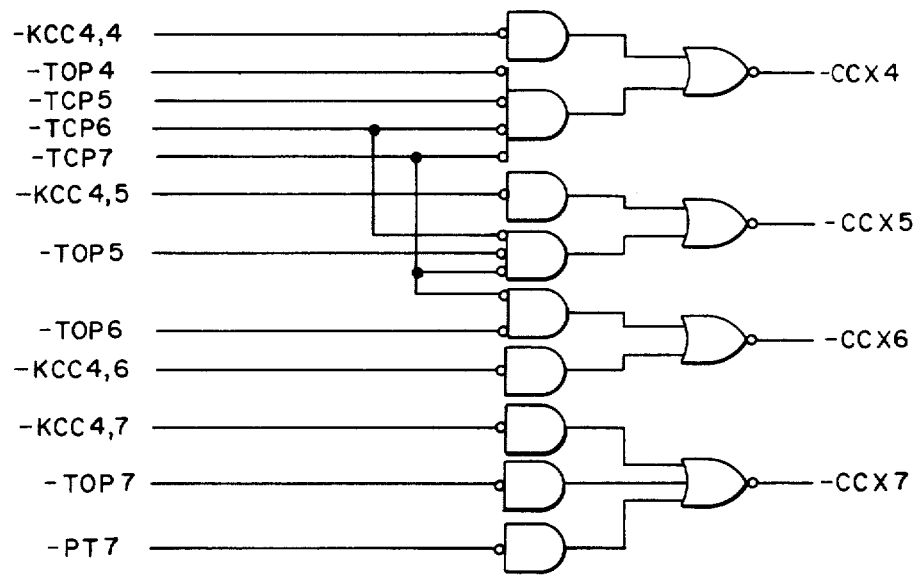
Figure 13:
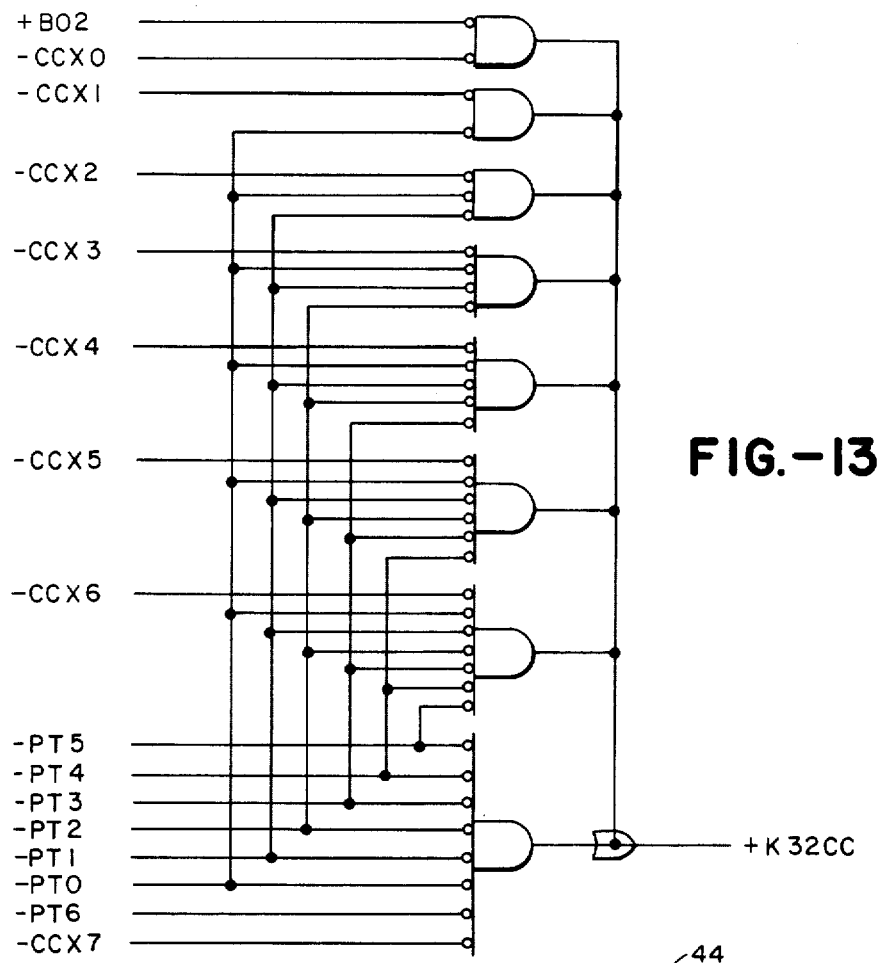

FIGS. 11 through 13 illustrate how K32CC is formed. Because of the need to carry-in two instead of one, two carry-propagate structures are required. One structure handles propagation of "two" while the other handles propagation of "one". These two structures are merged in FIGS. 11 and 12, and the final term is computed in FIG. 13. The INPUT and OUTPUT for FIGS. 11, 12, and 13 are shown in the following TABLE 10, TABLE 11, and TABLE 12, respectively.

TABLE 10

(FIG. 11)

| Input | Output (Comment) |
|---|---|
| −KCC4,0 | −CCX0 |
| −TOP0 | −CCX1 |
| −KCC4,1 | −CCX2 |
| −TOP1 | −CCX3 |
| −KCC4,2 | +BOZ |
| −TOP2 | (Both operands |
| −KCC4,3 | zero) |
| −TOP3 | |
| −TCP7 | |
| −TCP6 | |
| −TCP5 | |
| −TCP4 | |
| −TCP3 | |
| −TCP2 | |
| −TCP1 | |
| −TCP0 | |

TABLE 11

(FIG. 12)

| Input | Output |
|---|---|
| −KCC4,4 | −CCX4 |
| −TOP4 | −CCX5 |
| −TCP5 | −CCX6 |
| −TCP6 | −CCX7 |
| −TCP7 | |
| −KCC4,5 | |
| −TOP5 | |

TABLE 11-continued (FIG. 12)

| Input | Output |
|---|---|
| −TOP6 | |
| −KCC4,6 | |
| −KCC4,7 | |
| −TOP7 | |
| −PT7 | |

TABLE 12

(FIG. 13)

| Input | Output |
|---|---|
| +BOZ | +K32CC |
| −CCX0 | |
| −CCX1 | |
| −CCX2 | |
| −CCX3 | |
| −CCX4 | |
| −CCX5 | |
| −CCX6 | |
| −PT5 | |
| −PT4 | |
| −PT3 | |
| −PT2 | |
| −PT1 | |
| −PT0 | |
| −PT6 | |
| −CCX7 | |

Figure 14:
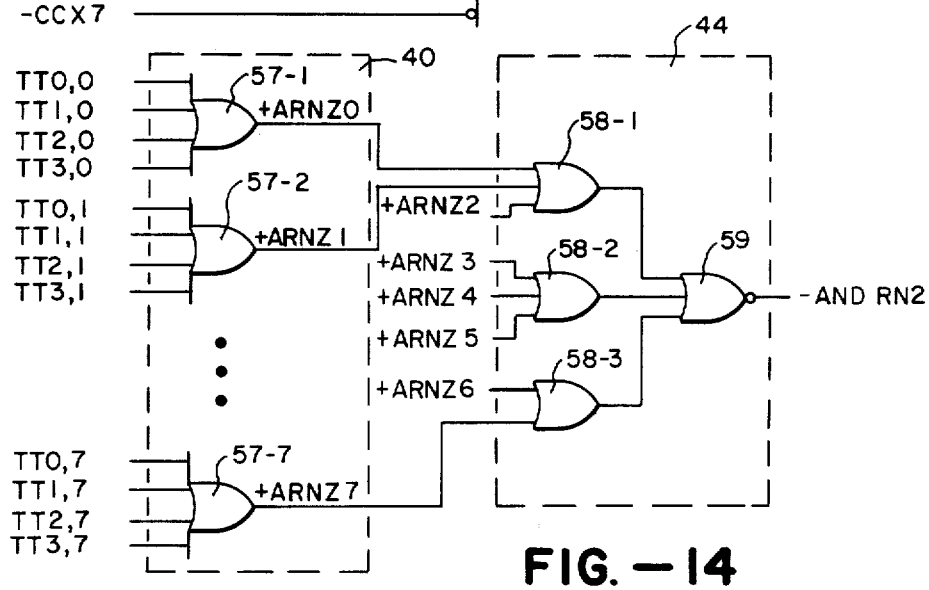
FIG. 14 represents the intermediate and final accumulation logic blocks for determining when the logical "AND" of the operands is non-zero.

In FIG. 14, the intermediate logic block 40 assembles the TTm,n outputs from the FIG. 4 bit slices the form the end result not 0 signals, +ARNZ0, +ARNZ1, ... , +ARNZ7 from the gates 57-1, 57-2, ..., 57-7. These signals are summarized in the following TABLE 13.

TABLE 13

| ARNZn | A non-zero result is obtained if the two operands produce a non-zero result when they are logically AND-ed together. ARNZn uses all 4 bits. |
|---|---|

In FIG. 14, the logic block 44 assembles, with OR gates 58-1, 58-2 and 58-3, all of the intermediate outputs from logic block 40. The output from gates 58-1 through 58-3 connect as inputs to the gate 59 to provide the final output −AND RNZ. This signal indicates that the logical AND of OP1 nd OP2 is non zero.

The logical functions set forth in the right-hand column of the following CHART 4 are the logical combinations performed by selection logic 26 of FIG. 1. The L stage 4-3 of FIG. 1 selects one of the logical combinations of CHART 4 when a prediction listed in the left-hand column is desired.

In Chart 4, the symbol "*" denotes the 1's complement of the quantity, the symbol ")(" denotes the logical AND function, and the symbol "+" denotes the logical OR function.

CHART 4

| Logical Compare | |
|---|---|
| Operands are equal: | (K32TC)(K32CT) |
| First operand is low: | *K32CT |
| Second operand is low: | *K32TC |
| Operands are unequal: | *(K32TC)(K32CT) |
| Logical Addition | |
| Result is zero, no carry: | Both operands zero |
| Result is non-zero, no carry: | *(K32TT + both operands zero) |
| Result is zero, carry: | (K32TT)(K32CC) |
| Result is non-zero, carry: | (K32TT)(*K32CC) |

-continued

CHART 4

| Logical Subtraction | |
|---|---|
| Result is non-zero, no carry: | *K32CT |
| Result is zero, carry: | (K32TC)(K32CT) |
| Result is non-zero, carry: | *K32TC |
| Algebraic Compare (Signs Equal) | |
| Operands are equal: | (K32TC)(K32CT) |
| First operand is low: | *K32CT |
| Second operand is low: | *K32TC |
| Algebraic Compare (Signs Different) | |
| First operand is low: | *K32TC |
| Second operand is low: | *K32CT |
| Logical Exclusive OR | |
| Result is zero: | (K32TC)(K32CT) |
| Result is non-zero: | *(K32TC)(K32CT) |
| Algebraic Addition (Signs Equal) | |
| Result is zero, no overflow: | Both operands zero |
| Result is negative, no overflow: | (K32TT)(K31TT) |
| Result is positive, no overflow: | *(K32TT + K31TT + Both operands zero) |
| Overflow: | K32TT $\oplus$ K31TT |
| Algebraic Addition (Signs Different) | |
| Result is zero: | (K32TT)(K32CC) |
| Result is negative: | *K32TT |
| Result is positive: | *K32CC |
| Algebraic Subtraction (Signs Equal) | |
| Result is zero: | (K32TC) · (K32CT) |
| Result is negative: | *K32CT |
| Result is positive: | *K32TC |
| Algebraic Subtraction (Signs Different) | |
| No overflow: | *(K32CT $\oplus$ K31CT) |
| Overflow: | K32CT $\oplus$ K31CT |
| Normalized Floating - Point Short Compare | |
| Operands equal: | (K32TC)(K32CT) |
| OP1 low: | (Both signs negative)(*K31TC) + (Both signs positive)(*K31CT) + (OP1 negative)(OP2 positive) (Both signs negative)(*K31CT) + (Both signs positive)(*K31TC) + (OP1 positive)(OP2 negative) |
| Logical AND | |
| Result is zero: | *("AND" result non-zero) |
| Result is non-zero: | ("AND" result non-zero) |
| Logical Inclusive OR | |
| Result is zero: | Both operands zero |
| Result is non-zero: | *(Both operands zero) |
| Fixed Point Divide | |
| 32 bit Divisor is not greater than high-order 32 bits of Dividend | K32TC |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data processing system operating in response to instructions, where the instructions specify the operations to be executed and the operands to be utilized in executing the instructions, said instructions including a branch instruction specifying a branch instruction stream to be taken in accordance with a condition code identified by said branch instruction, and including a condition code-setting instruction specifying an operation to be executed and first and second operands to be utilized in executing the condition code-setting instruction, comprising:

instruction means for processing instructions, including said condition code-setting instruction, and for selecting said branch instruction stream as a function of the setting of said condition code;

comparator means for comparing said first and second operands specified by said condition code-setting instruction to form a comparison result, said comparator means including one or more half-adders receiving said first and second operands and operative to form said comparison result for predicting codes, means responsive to said comparison result in said comparator means for setting said condition code without the necessity of waiting for the execution of the operation specified by said code-setting instruction.

2. The system of claim 1 wherein said comparator means includes a plurality of half-adders each of said half-adders for providing carry-out signals to provide said comparison result as a function of said first and second operands.

3. The system of claim 1 wherein said instruction means includes, a plurality of one-cycle stages forming a pipeline for processing instructions, means for introducing a plurality of segmented instructions into said pipeline with a minimum time-offset between instructions equal to one cycle, and wherein said stages include a stage for operand address generation during a generation segment, a stage for accessing the operands from generated addresses during an access segment, a stage for comparing said operands during a comparison segment, a stage for execution of the operation specified by said instruction during an execution segment, a stage for storing the results of the execution during a store segment, and wherein said means responsive includes, means operative to set said condition code during said comparison segment.

4. The system of claim 1 wherein said instruction means includes first and second registers for storing said first and second operands specified by said condition code-setting instruction.

5. The system of claim 1 wherein said comparator means includes a true-true half-adder receiving a true value of the first operand and a true value of the second operand to provide a true-true carry-out signal to form said comparison result for predicting said codes.

6. The system of claim 5 wherein said true-true half-adder includes means to generate said true-true carry-out signal in response to all bits for said first and second operands except a highest order bit.

7. The system of claim 1 wherein said comparator means includes a true-complement half-adder for receiving a complemented value of said first operand and a true value of said second operand to provide a true-complement carry-out signal to form said comparison result for predicting said codes.

8. The system of claim 7 wherein said true-complement half-adder includes means to generate said true-complement carry-out signal in response to all bits of said first and second operands except a highest-order bit.

9. The system of claim 1 wherein said comparator means includes a complement-true half-adder which receives the true value of said first operand and the complemented value of said second operand to provide a complement-true carry-out signal to form said comparison result for predicting said codes.

10. The system of claim 9 wherein said complement-true half-adder includes means to generate said complement-true carry-out signal in response to all bits of said first and second operands except for the highest-order bits.

11. The system of claim 1 wherein said comparator means includes a complement-complement half-adder for receiving the complemented value of both said first and second operands to provide a complement-complement carry-out signal to form said comparison result for predicting said codes.

12. The system of claim 11 wherein said complement-complement half-adder includes means to generate said complement-complement carry-out signal in response to all bits of said first and second operands except the highest-order bit.

13. The system of claim 1 wherein said comparator means includes, a true-true half-adder for receiving the true value of said first and said second operands for providing a true-true carry-out signal, a true-complement half-adder receiving the complemented value of said first operand and the true value of said second operand for providing a true-complement carry-out signal, a complement-true half-adder for receiving the true value of said first operand and the complemented value of said second operand for providing a complement-true carry-out signal, a complement-complement half-adder receiving the complement of both said first and second operands to provide a complement-complement carry-out signal, selection means connected to receive the true-true carry-out signal, said true-complement carry-out signal, said complement-true carry-out signal and said complement-complement carry-out signal, said selection means operative to select predetermined ones of said carry-out signals to provide a code-setting signal, means for storing said code-setting signal as said comparison result.

14. The system of claim 13 wherein said condition code-setting instruction specifies a logical compare and said selection means selects said true-complement carry-out and said complement-true carry-out signals to predict the results of said logical compare.

15. The system of claim 13 wherein said condition code-setting instruction specifies a logical subtraction and said selection means selects said complement-true carry-out and said true-complement carry-out signals to predict the results of said logical subtraction.

16. The system of claim 13 wherein said condition code-setting instruction specifies an algebraic comparison and said selection means selects said true-complement carry-out and said complement-true carry-out signals to predict the results of said algebraic comparison.

17. The system of claim 13 wherein said condition code-setting instruction specifies a logical Exclusive OR and said selection means selects said true-complement carry-out and said complement-true carry-out signals to predict the results of said logical Exclusive OR.

18. The system of claim 13 wherein said condition code-setting instruction specifies an algebraic subtraction and said selection means selects said true-complement carry-out and said complement-true carry-out signals to predict the results of said algebraic subtraction when the signs of said operands are the same.

19. The system of claim 13 wherein said condition code-setting instruction specifies an algebraic addition and said selection means selects said true-true carry-out and said complement-complement carry-out signals to predict the results of said algebraic addition when the signs of said operands are different.

20. The system of claim 13 wherein said comparator means includes means for determining when both operands are zero to provide a both-zero signal and wherein said selection means includes means for selecting said both-zero signal.

21. The system of claim 20 wherein said condition code-setting instruction specifies a logical addition and said selection means selects said true-true carry-out signal, said complement-complement carry-out signal and said both-zero signal to predict the results of said logical addition.

22. The system of claim 20 wherein said condition code-setting instruction specifies an albebraic addition and said selection means selects said true-true carry-out signal and said both-zero signal to predict the results of said algebraic addition when the signs of said operands are the same.

23. A data processing system having storage apparatus, instruction handling apparatus and instruction execution apparatus wherein the system performs data manipulations under the control of instructions having operation codes for specifying operations to be executed and having operand fields for identifying operands to be utilized in executing the operation codes, and where instructions are processed in segments where each segment has a duration equal to one or more clock cycles, comprising:
  clock means providing clock signals which define clock cycles for controlling the data processing system,
  instruction sequence processing means for processing instructions including a branch instruction specifying one of a plurality of possible instruction streams to be taken in accordance with a condition code specified by said branch instruction and including a condition code-setting instruction specifying operands to be utilized in executing the condition code-setting instruction, said instruction sequence processing means including a plurality of stages for storing instruction fields, said stages forming a pipeline for processing instructions to control the execution of the operations specified by the instructions,
  means for sequentially stepping under control of said clock means a plurality of said instruction including said condition code-setting instruction through said pipeline with a time-offset between consecutive instructions in said pipeline,
  comparator means for comparing the operands specified by said condition code-setting instruction to form a comparison result before the operation specified by the condition code-setting instruction is executed,
  means responsive to the operation code of said condition code-setting instruction from one of said plurality of stages prior to execution of the operation specified by the operation code of said code-setting instruction in said instruction sequence processing means and to said comparison result in said comparator means for setting said condition code without the necessity of waiting for the execution of the operation specified by the operation code of said code-setting instruction.

24. In a data processing system operating in response to instructions where the instructions specify the operations to be executed and the operands to be utilized in executing the instructions, said instructions including a branch instruction specifying a branch instruction stream to be taken in accordance with a condition code identified by said branch instruction, and including a condition code-setting instruction specifying an operation to be executed and first and second operands to be utilized in executing the condition code-setting instruction, the method comprising:
  processing instructions to select said branch instruction stream as a function of the setting of said condition code,
  comparing said first and second operands specified by said condition code-setting instruction to form a comparison result, said comparing forming one or more half-adder carry-out signals to provide said comparison result for predicting codes,
  setting said condition code in response to said comparison result without the necessity of waiting for the execution of the operation specified by said code-setting instruction.

* * * * *